United States Patent
Granottier et al.

(10) Patent No.: US 11,892,072 B2
(45) Date of Patent: Feb. 6, 2024

(54) METHOD OF MANAGING THE OIL TEMPERATURE OF A TRANSMISSION OF A MOTOR VEHICLE

(71) Applicant: Volvo Truck Corporation, Gothenburg (SE)

(72) Inventors: Nicolas Granottier, Lyons (FR); Baptiste Boutin, La Tour-du-Pin (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/695,522

(22) Filed: Mar. 15, 2022

(65) Prior Publication Data

US 2022/0316577 A1 Oct. 6, 2022

(30) Foreign Application Priority Data

Mar. 31, 2021 (EP) ..................... 21166410

(51) Int. Cl.
*F16H 57/04* (2010.01)

(52) U.S. Cl.
CPC ..... *F16H 57/0413* (2013.01); *F16H 57/0417* (2013.01); *F16H 57/0436* (2013.01)

(58) Field of Classification Search
CPC .......... F16H 57/0413; F16H 57/0417; F16H 57/0436; F01M 5/005; F01M 5/00; F01M 5/001
See application file for complete search history.

(56) References Cited

U.S. PATENT DOCUMENTS

| | | | | |
|---|---|---|---|---|
| 8,348,807 | B2* | 1/2013 | Pursifull | F16H 61/0031 477/98 |
| 9,360,104 | B1* | 6/2016 | Lippert | F16H 57/0413 |
| 10,752,129 | B2* | 8/2020 | Julien | H01M 10/625 |
| 10,829,005 | B2* | 11/2020 | Onozawa | B60L 3/0023 |
| 11,485,252 | B2* | 11/2022 | Lee | H01M 10/625 |
| 2010/0197441 | A1* | 8/2010 | Pursifull | F16H 57/0413 475/161 |

(Continued)

FOREIGN PATENT DOCUMENTS

| | | |
|---|---|---|
| EP | 2500535 A1 | 9/2012 |
| EP | 3486994 B1 | 12/2019 |

(Continued)

OTHER PUBLICATIONS

Extended European Search Report for European Patent Application No. 21166410.7, dated Sep. 21, 2021, 8 pages.

*Primary Examiner* — Michael A Riegelman

(74) *Attorney, Agent, or Firm* — Withrow & Terranova, PLLC

(57) ABSTRACT

The invention relates to a method of managing the oil temperature of a transmission of a motor vehicle, the transmission comprising a lubrication circuit and an oil cooling circuit, the oil temperature management circuit comprising a liquid/liquid heat exchanger mounted on the lubrication circuit, the lubrication circuit comprising a pump for circulating the oil in the lubrication circuit, and a temperature sensor wherein, before a starting stage of the vehicle, if the temperature of the oil is lower than a first value, the pump of the lubrication circuit is activated so as to circulate the oil in the liquid/liquid exchanger.

11 Claims, 1 Drawing Sheet

(56) References Cited

U.S. PATENT DOCUMENTS

| | | | | |
|---|---|---|---|---|
| 2011/0111920 | A1* | 5/2011 | Gooden | F01M 5/005 |
| | | | | 477/98 |
| 2012/0125278 | A1* | 5/2012 | Ries-Mueller | F16H 57/0413 |
| | | | | 123/142.5 R |
| 2013/0042825 | A1* | 2/2013 | Shimasaki | F01M 5/005 |
| | | | | 123/2 |
| 2013/0152892 | A1* | 6/2013 | Hawkins | F01M 5/021 |
| | | | | 903/904 |
| 2019/0070924 | A1* | 3/2019 | Mancini | B60H 1/00564 |
| 2019/0085751 | A1* | 3/2019 | Yamazaki | F25D 17/02 |
| 2019/0152343 | A1* | 5/2019 | Onozawa | F01P 7/14 |
| 2020/0130534 | A1* | 4/2020 | Julien | H01M 10/625 |
| 2021/0277987 | A1* | 9/2021 | Moore | F16H 57/0415 |
| 2022/0243801 | A1* | 8/2022 | Pandit | F16H 59/72 |
| 2022/0259825 | A1* | 8/2022 | Cliff | B60L 53/14 |
| 2022/0316577 | A1* | 10/2022 | Granottier | F16H 57/0436 |
| 2022/0316583 | A1* | 10/2022 | Granottier | F16H 57/045 |
| 2023/0080987 | A1* | 3/2023 | Jeon | F01M 11/0004 |

FOREIGN PATENT DOCUMENTS

| | | |
|---|---|---|
| EP | 3643889 A1 | 4/2020 |
| GB | 2454349 A | 5/2009 |
| JP | H08183324 A | 7/1996 |

\* cited by examiner

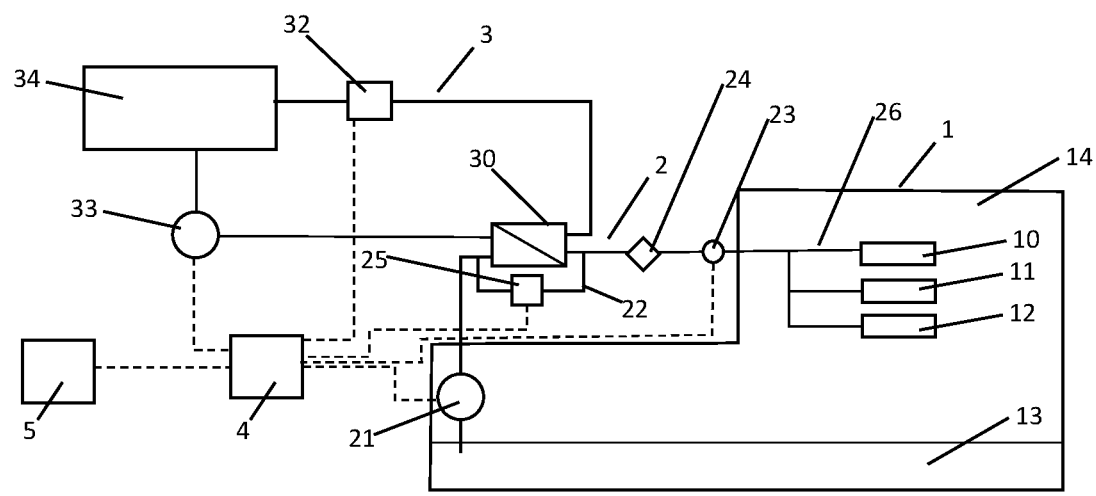

METHOD OF MANAGING THE OIL TEMPERATURE OF A TRANSMISSION OF A MOTOR VEHICLE

RELATED APPLICATIONS

The present application claims priority to European Patent Application No. 21166410.7, filed on Mar. 31, 2021, and entitled "METHOD OF MANAGING THE OIL TEMPERATURE OF A TRANSMISSION OF A MOTOR VEHICLE," which is incorporated herein by reference in its entirety.

TECHNICAL FIELD

The invention concerns the field of motor vehicle transmissions and more particularly the lubrication of the transmission.

The invention can be applied in heavy-duty vehicles, such as trucks, buses and construction equipment.

BACKGROUND

The development of new electric drives for electric or hybrid vehicles requires adaptations in terms of cooling and lubrication. An internal combustion engine provides, via a pulley and belt driven by the crankshaft directly, the force required to drive an oil pump in the lubrication circuit and/or a water pump in the cooling circuit. In contrast, the electric motor is only used to move the vehicle and/or generate electric current. The pumps of the lubrication and cooling circuits are electric. To ensure cooling of the oil used to lubricate the electric vehicle's transmission, the lubrication circuit usually includes a heat exchanger.

During cold starts in low temperature conditions, it is desirable that the oil reaches a minimum temperature to ensure optimum lubrication of the transmission.

There are solutions in which an electric oil heater is mounted on the lubrication circuit. When the oil temperature is too low, the heater is activated.

This solution is expensive and requires the installation of new components such as the electric heater, heater control, wiring etc.

SUMMARY

The first object of the invention is to provide a method of managing the oil temperature of a transmission of a motor vehicle increasing the oil temperature during cold start of the vehicle without using additional component.

The object is achieved by a method of managing the oil temperature of a transmission of a motor vehicle, the transmission comprising a lubrication circuit and an oil temperature management circuit, the oil temperature management circuit comprising a liquid/liquid heat exchanger mounted on the lubrication circuit, the lubrication circuit comprises a pump for circulating the oil in the lubrication circuit and a temperature sensor characterized in that, before a starting stage of the vehicle, if the temperature of the oil is lower than a first value, the pump of the lubrication circuit is activated so as to circulate the oil in the liquid/liquid exchanger.

By the provision of above method of managing the oil temperature of a transmission of a motor vehicle, the heat capacity left in a coolant circuit, is used to warm the oil before starting the vehicle.

According to one embodiment, the first value of the temperature is between −10° C. and 10° C. This temperature corresponds to the operational temperature of the oil.

According to a further embodiment, the oil temperature management circuit is connected to a battery temperature management fluid circuit of the motor vehicle, so that before the starting step of the vehicle, the battery temperature management fluid circuit is activated, so as to raise the temperature in the exchanger of the oil temperature management circuit. This arrangement allows to use existing component to increase oil temperature before vehicle start.

According to a further embodiment, the step of starting the vehicle when the oil temperature reaches a second value or after a specified time no greater than 5 min.

According to a further embodiment, the second value of the oil temperature is greater than 0° C.

According to a further embodiment, when the oil temperature is higher or equal than the first value, the circulation of oil in the liquid/liquid exchanger is stopped or by-pass.

A second object of the invention is to provide a lubrication circuit of a motor vehicle transmission comprising:
 a pump to circulate the oil in the lubrication circuit,
 an oil temperature sensor,
 an oil temperature management circuit comprising a liquid/liquid exchanger,
 a control unit connected to the pump, the oil temperature sensor and a vehicle start detection module, characterized in that the control unit activates the pump when the oil temperature is below a first value and when the vehicle start detection module detects an imminent start of the vehicle.

According to a further embodiment, the first temperature value is between −10° C. and 10° C.

According to a further embodiment, the oil temperature management circuit is connected to a battery temperature management fluid circuit of the motor vehicle, so that a control unit controls the battery temperature management fluid circuit of the motor vehicle, so that it is activated before the vehicle is started, in order to raise the temperature in the exchanger of the oil temperature management circuit.

A third object of the invention is to provide a motor vehicle comprising a circuit for lubricating a transmission according the second object of the invention A fourth object of the invention is to provide a control unit for controlling at least the following components:
 a pump of a lubrication circuit of a vehicle transmission,
 a temperature sensor of the oil in the lubrication system,
 a vehicle start detection module,
and the control unit is configured to perform the steps of the method according to the first object.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic view of vehicle transmission with its lubrication circuit

DETAILED DESCRIPTION OF EXAMPLE EMBODIMENTS OF THE INVENTION

With reference to FIG. 1, a motor vehicle transmission comprises in a manner known per se a housing 1, in which the transmission components such as bearings 10, pinions 11, shafts 12 are housed. The lower part 13 of housing 1 is the oil reservoir, hereinafter referred to as the sump. This oil is used to lubricate transmission components 10, 11, 12.

For this purpose, a lubrication circuit 2 is provided to circulate the oil in the transmission. The transmission system includes a pump 21 that draws oil from the lower part of the sump 13 and circulates it through lubrication system 2.

Lubrication system 2 also includes a filter 24 and a temperature sensor 23 for the oil circulating in lubrication system 2. Lubrication system 2 includes at least one nozzle or jet 26 near components 10, 11, 12 of the transmission to be lubricated.

When the motor vehicle is an electric vehicle, pump 21 is an electric pump. In other words, pump 21 can be activated or deactivated independently of the movement of the vehicle or the activation of the vehicle's propulsion system.

A heat exchanger 30, e.g. liquid/liquid, is also fitted to lubrication circuit 2, in order to adjust the oil temperature, for example, to ensure optimum lubrication.

The heat exchanger 30 can, for example, be a component of a cooling/heating circuit 3 of a motor vehicle battery pack 34. The cooling/heating circuit consists of one or more of the following components: a pump 33, an electric heater 32, an air/liquid exchanger (not shown).

The lubrication circuit 2 may include a bypass circuit 22 of the liquid/liquid exchanger 30. This by-pass circuit 22 includes a valve 25 which, in the closed position, allows oil to circulate in the liquid/liquid exchanger 30, and in the open position, allows oil not to circulate in the liquid/liquid exchanger 30. In another embodiment, the valve 25 could be put in any intermediate position to manage the heat transfer to the oil.

The motor vehicle also includes a control unit 4 connected to the following components among others:
pump 21 of the lubrication circuit,
the oil temperature sensor 23,
the valve 25 of the by-pass circuit 22,
pump 33 of the cooling/heating circuit 3 of the motor vehicle's battery pack 34,
the electric heater 33.

The control unit 4 is also connected to a vehicle start detection module 5. This detection module is used to determine the imminence of the vehicle start. For example, detection module 5 is connected to the vehicle's remote locking system and/or vehicle ignition and/or seat belt buckle sensor or other user actuated device just prior to vehicle start.

During operation of the motor vehicle, i.e., when the transmission is under load, the pump 21 of the lubrication circuit is activated by the control unit 4, in order to supply the circuit oil to the transmission components and thus ensures optimum lubrication.

As long as the oil temperature in lubrication circuit 2 is below a first value, valve 25 of bypass circuit 22 is kept in the open position. This first temperature value corresponds to a maximum temperature above which the lubricating properties of the oil deteriorate. Valve 25 of the bypass circuit 22 is activated by the control unit, which also receives a temperature signal from the temperature sensor 23.

When the oil temperature in lubrication circuit 2 is above or equal the first value, valve 25 of the bypass circuit 22 is held in the closed position, so that the oil flows through the liquid/liquid exchanger 30 to be cooled.

When the oil temperature in lubrication circuit 2 is equal to the high value.

In a manner known per se, the lubricating properties of the oil also deteriorate if the oil temperature is too low. However, there are scenarios where a motor vehicle's transmission will be called upon when the oil temperature is low. This is the case, for example, when the motor vehicle is parked at a standstill (engine off) while the outside temperature is low or very low (below zero degrees for example).

The purpose of the invention is to allow an increase in the oil temperature before starting the vehicle and loading the transmission without changing the lubrication circuit. Thus, according to the invention, when the oil temperature is lower than a first value and the imminence of a vehicle start is detected, pump 21 of the lubrication circuit is activated and valve 25 of the bypass circuit 22 is closed, so that the oil circulates in the liquid/liquid exchanger 30. The liquid/liquid exchanger 30 is in fact a heat source, since the heat transfer fluid used in the liquid/liquid exchanger 30 has the function of cooling the oil and thus storing heat when the vehicle is in operation. When the vehicle is in operation these calories are evacuated via the exchanger of the cooling circuit 2 of the batteries 34. When the vehicle stops, the heat transfer fluid remains warm for a certain period (from a few minutes to a few hours). It is therefore understandable that the oil will heat up in the liquid/liquid exchanger 30 when the vehicle has not yet started.

Once the vehicle is started, the oil will continue to heat up normally when lubricating the transmission. When the oil temperature reaches a second value higher than the first value, control unit 4 sends a signal to open valve 25 of the bypass circuit, so that the oil no longer flows through the liquid/liquid exchanger 30. The first temperature value corresponds to a temperature at which the lubricating properties of the oil are satisfactory or even optimal. Therefore, it is no longer necessary to heat the oil. The first value depends on the quality of the oil and is, for example, between −10° C. and 10° C.

In another embodiment, valve 25 of the bypass circuit is kept in close position, allowing circulation in liquid/liquid exchanger 30, as long as the oil temperature is below the temperature inside the liquid/liquid exchanger. Then, even after starting the vehicle, the oil continues to be heated by circulating into liquid/liquid exchanger In order to accelerate the heating of the oil in the phase before starting the vehicle, the control unit 4 can also activate the electric heater 32 and the pump 33 of the cooling/heating circuit 3 of the vehicle's battery pack 34. In this way, the temperature of the cooling/heating fluid in cooling/heating circuit 3 will increase rapidly even in the liquid/liquid exchanger 30. In addition, the oil will also heat up as it circulates through the liquid/liquid exchanger 30.

Depending on the design variant, the vehicle will only start or be started when the oil temperature is above a second value. This ensures that the oil is at a temperature that ensures optimum lubrication. The second temperature value is higher than the first value.

It is understood that the method of oil temperature management according to the invention ensures minimal reheating of the transmission oil with a start, without the need to modify the oil circuit and/or add a specific oil heating element. In case, the oil temperature does not reach a second value after a certain period of time (from few second to maximum of 5 min) start of the vehicle will be possible.

The control unit 4 therefore comprises a computer program capable of executing the commands necessary to implement the method according to the invention. In particular, the computer program includes a signal processing unit receiving the signal from the temperature sensor representative of the oil temperature value as well as the signal from the vehicle start detection module 5. The control unit 4 also includes a control signal generating unit for, among other things, activating or deactivating the following components:

pump 21 of the lubrication system,
the valve 25 of the by-pass circuit 22,
pump 33 of the cooling/heating circuit 3 of the motor vehicle's battery pack 34,
the electric heater 33.

It is to be understood that the present invention is not limited to the embodiments described above and illustrated in the drawings; rather, the skilled person will recognize that many changes and modifications may be made within the scope of the appended claims.

The invention claimed is:

1. A method for managing an oil temperature of a transmission of a motor vehicle, the transmission comprising:
    a lubrication circuit, and
    an oil temperature management circuit comprising:
        a liquid/liquid heat exchanger mounted on the lubrication circuit,
        the lubrication circuit comprising:
            a pump for circulating oil in the lubrication circuit,
            a vehicle start detection module connected to a user device that is actuated just prior to vehicle cold start, and
            a temperature sensor;
    wherein the method comprises, before a starting stage of the motor vehicle, determining an imminence of the vehicle start, determining whether the temperature of the oil is lower than a first value, and activating the pump of the lubrication circuit so as to circulate the oil in the liquid/liquid heat exchanger if the temperature of the oil is lower than the first value.

2. The method of claim 1, wherein the first value of the temperature is between −10° C. and 10° C.

3. The method of claim 1, wherein the oil temperature management circuit is connected to a battery temperature management fluid circuit of the motor vehicle and wherein the method further comprises, before the starting stage of the motor vehicle, activating the battery temperature management fluid circuit so as to raise the temperature in the liquid/liquid heat exchanger of the oil temperature management circuit.

4. The method of claim 1, further comprising the step of starting the motor vehicle, when the oil temperature reaches a second value or after a specified time no greater than 5 minutes.

5. The method of claim 4, wherein the second value of the oil temperature is greater than 0° C.

6. The method of claim 1, wherein the method further comprises stopping the circulation of oil in the liquid/liquid heat exchanger when the oil temperature is higher than the first value.

7. A control unit for controlling at least the following components:
    a pump of a lubrication circuit of a vehicle transmission,
    a temperature sensor of oil in the lubrication circuit, and
    a vehicle start detection module,
wherein the control unit is configured to perform the steps of the method of claim 1.

8. A lubrication circuit of a motor vehicle transmission comprising:
    a pump to circulate oil in the lubrication circuit,
    an oil temperature sensor,
    an oil temperature management circuit comprising a liquid/liquid heat exchanger, and
    a control unit connected to the pump, the oil temperature sensor and a vehicle start detection module connected to a user device that is actuated just prior to vehicle cold start,
    wherein the control unit is configured to activate the pump when the oil temperature is below a first temperature value before a starting stage of the motor vehicle and when the vehicle start detection module detects an imminent start of the motor vehicle.

9. The lubrication circuit of claim 8, wherein the first temperature value is between −10° C. and 10° C.

10. The lubrication circuit of claim 8, wherein:
    the oil temperature management circuit is connected to a battery temperature management fluid circuit of the motor vehicle, and
    a control unit controls the battery temperature management fluid circuit of the motor vehicle so that it is activated before the motor vehicle is started, in order to raise the temperature in the liquid/liquid heat exchanger of the oil temperature management circuit.

11. A motor vehicle comprising the lubrication circuit of claim 8.

* * * * *